United States Patent
Felsenthal et al.

(10) Patent No.: US 11,572,092 B2
(45) Date of Patent: Feb. 7, 2023

(54) LIFT OFF STORAGE DEVICE AND ORGANIZER

(71) Applicant: Whitmor, Inc., Southaven, MS (US)

(72) Inventors: Sandy Felsenthal, Memphis, TN (US); Gil Gaska, Germantown, TN (US)

(73) Assignee: Whitmor, Inc., Southaven, MS (US)

( * ) Notice: Subject to any disclaimer, the term of this patent is extended or adjusted under 35 U.S.C. 154(b) by 0 days.

(21) Appl. No.: 17/093,601

(22) Filed: Nov. 9, 2020

(65) Prior Publication Data
US 2021/0139064 A1     May 13, 2021

Related U.S. Application Data

(60) Provisional application No. 62/933,150, filed on Nov. 8, 2019.

(51) Int. Cl.
*B62B 3/10* (2006.01)
*B62B 3/02* (2006.01)

(52) U.S. Cl.
CPC .............. *B62B 3/106* (2013.01); *B62B 3/02* (2013.01); *B62B 2202/22* (2013.01)

(58) Field of Classification Search
CPC ....... B62B 3/106; B62B 3/02; B62B 2202/22; B62B 2202/66; B62B 2205/30; B62B 2202/26; B62B 3/1464; B62B 1/266; B62B 2202/50; B62B 2202/12; D06F 95/002; D06F 95/004; A61G 12/001; B65B 67/12; B65B 67/1238; B65G 1/141; B65G 1/1415
See application file for complete search history.

(56) References Cited

U.S. PATENT DOCUMENTS

| | | | | |
|---|---|---|---|---|
| 1,572,971 A * | 2/1926 | Paulr | ..................... | D06F 95/004 |
| | | | | 211/12 |
| 3,161,391 A * | 12/1964 | Bahnsen | ............... | D06F 95/004 |
| | | | | 248/99 |
| 3,633,859 A * | 1/1972 | Vosbikian | ........... | B65B 67/1227 |
| | | | | 248/165 |
| 3,633,932 A * | 1/1972 | Holden | ................. | D06F 95/004 |
| | | | | 220/9.3 |
| 4,623,111 A * | 11/1986 | Prader | ................... | B65F 1/1607 |
| | | | | 220/9.4 |
| 4,723,743 A * | 2/1988 | Jenkins | .................... | B65B 67/12 |
| | | | | 220/9.4 |
| 4,974,799 A * | 12/1990 | Palmer | .................... | B62B 3/106 |
| | | | | 248/302 |
| 5,678,842 A * | 10/1997 | Hook | ...................... | B62B 1/266 |
| | | | | 280/DIG. 3 |

(Continued)

FOREIGN PATENT DOCUMENTS

| | | | | |
|---|---|---|---|---|
| FR | 2556300 A1 * | 6/1985 | | |
| FR | 2907087 A1 * | 4/2008 | ............... | B62B 1/12 |

(Continued)

*Primary Examiner* — James A Shriver, II
*Assistant Examiner* — Ian Bryce Shelton
(74) *Attorney, Agent, or Firm* — Stites & Harbison PLLC; Richard S. Myers, Jr.

(57) ABSTRACT

A storage device that includes at least one bag body with sidewalls with pockets, and handles incorporated into the sidewall and the pockets. The bag rests on a frame that includes pocket supports. The bag can be received and supported by the pocket supports on the frame.

13 Claims, 7 Drawing Sheets

(56) References Cited

U.S. PATENT DOCUMENTS

| | | | | |
|---|---|---|---|---|
| 5,775,649 | A * | 7/1998 | O'Leary | B65B 67/12 |
| | | | | 141/391 |
| 6,659,273 | B1 * | 12/2003 | Scola | A45C 15/00 |
| | | | | 206/285 |
| 8,100,280 | B1 * | 1/2012 | Hernandez | D06F 95/002 |
| | | | | 220/9.4 |
| 8,905,411 | B1 * | 12/2014 | Blanton | B62B 3/1464 |
| | | | | 280/47.35 |
| 8,910,813 | B1 * | 12/2014 | Barre | D06F 95/002 |
| | | | | 220/528 |
| 2006/0157358 | A1 * | 7/2006 | Heidel | D06F 95/002 |
| | | | | 206/278 |
| 2006/0175474 | A1 * | 8/2006 | Lawson | D06F 95/002 |
| | | | | 383/23 |
| 2006/0255213 | A1 * | 11/2006 | Lawson | D06F 95/004 |
| | | | | 248/95 |
| 2007/0068942 | A1 * | 3/2007 | Smudde | B65F 1/163 |
| | | | | 220/23.86 |
| 2009/0092342 | A1 * | 4/2009 | Rolim de Oliveira | |
| | | | | B62B 3/1464 |
| | | | | 383/7 |
| 2014/0217247 | A1 * | 8/2014 | Kemmer | B65B 67/1205 |
| | | | | 248/97 |
| 2019/0276063 | A1 * | 9/2019 | Sturgeon | B62B 3/106 |

FOREIGN PATENT DOCUMENTS

| | | | | |
|---|---|---|---|---|
| FR | 2983158 A1 * | 5/2013 | | A45C 13/001 |
| WO | WO-2010031854 A1 * | 3/2010 | | A45C 3/04 |

* cited by examiner

FIG. 1
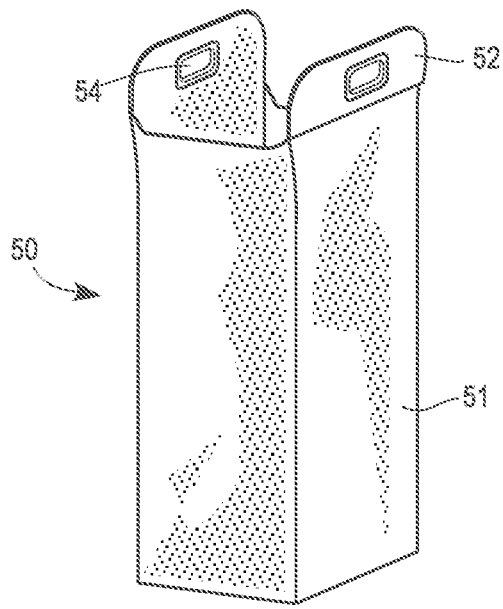
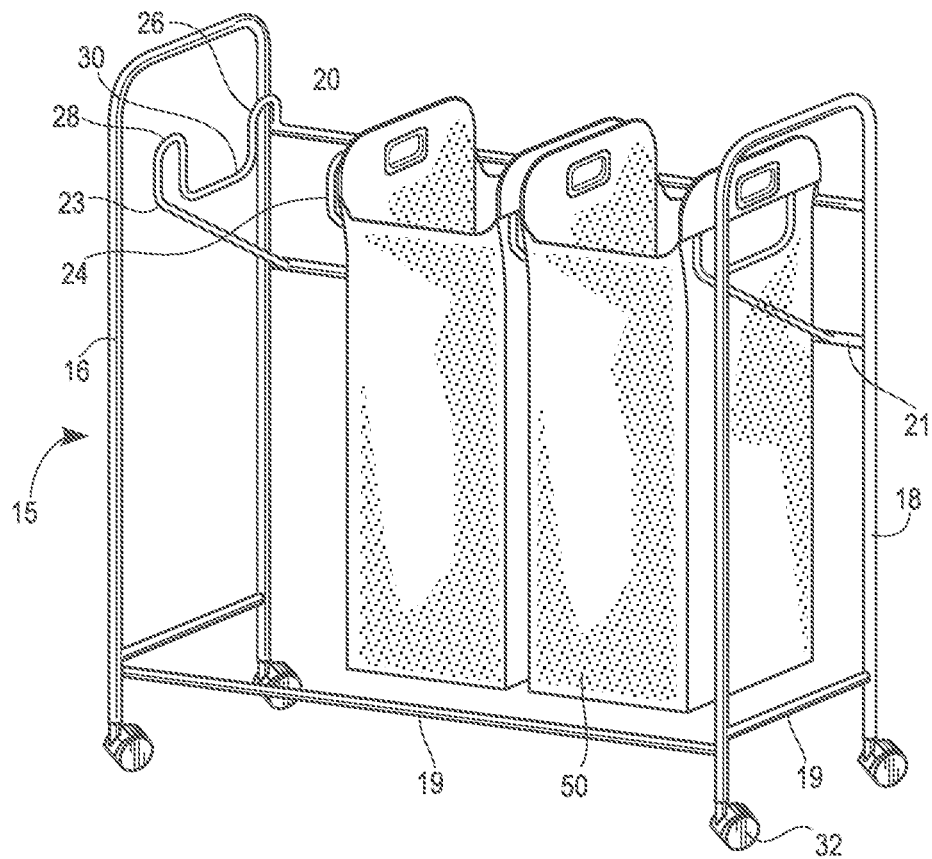

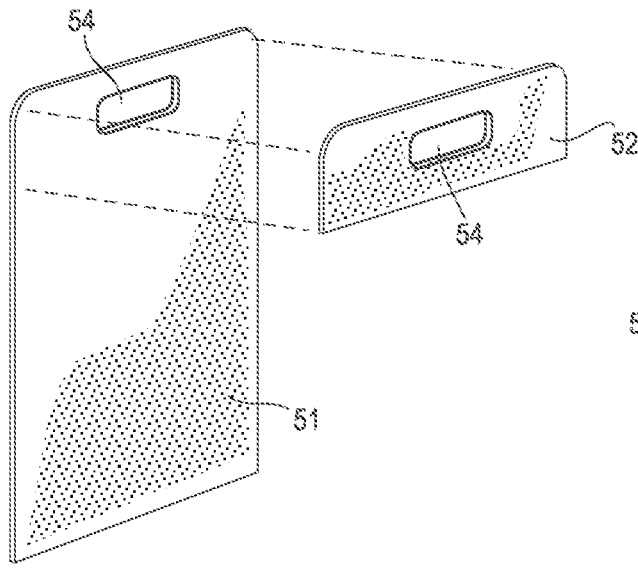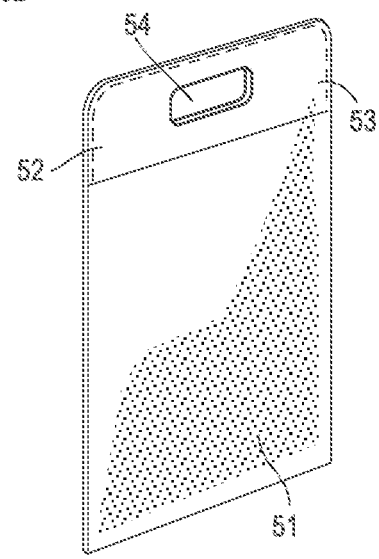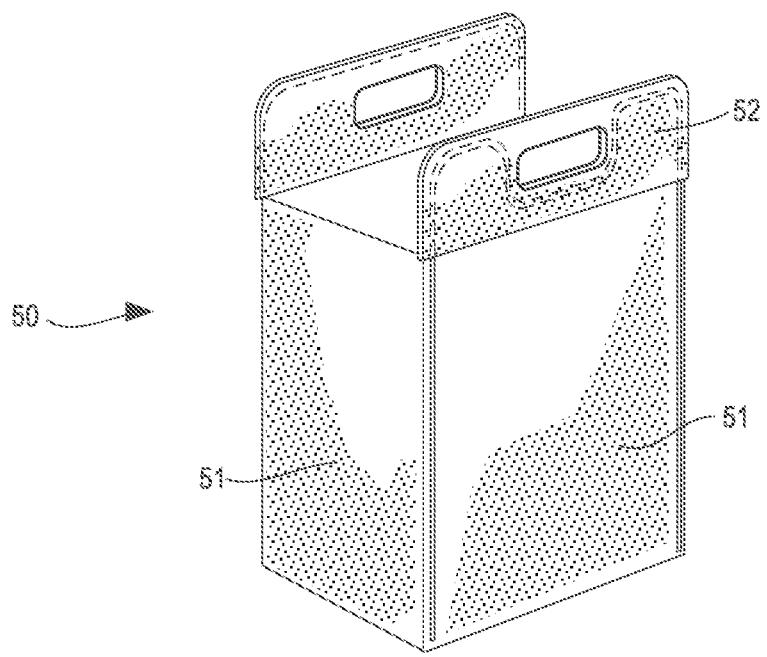

LIFT OFF STORAGE DEVICE AND ORGANIZER

PRIOR APPLICATIONS

This application claims benefit to U.S. Application No. 62/933,150, filed Nov. 8, 2019, the contents of which are incorporated herein by reference in its entirety.

FIELD OF THE INVENTION

Aspects of the present invention relate to storage units, typically bags, that rest in a frame. The bags are easily removable from the frame. Multiple bags on a single frame allows for sorting and storing items such as laundry. In the case of laundry, the present invention allows a user to sort laundry in different bags prior to washing.

SUMMARY OF THE INVENTION

While compartmental laundry hampers or devices that house multiple laundry bags are known, the present invention has many advantages.

One embodiment of the present invention is a laundry hamper or sorter, that comprises at least one bag that removably rests on a frame. In one embodiment, at least three bags can removably rest on a frame.

The removable bags help facilitate the sorting of goods stored therein. For example, when the bags are used as laundry bags, clothes may be separated and sorted in the different bags on the frame by color, wash load temperature, or type of clothing. In other words, the present invention allows the laundry to be pre-sorted with the groups separately stored. When it is time to wash clothes, any particularly bag can be removed from the frame and taken to the washing machine.

In certain embodiments of the present invention, the bags are optionally frameless, meaning that they are constructed without an internal support. The bags of the present invention include left and right pockets, and corresponding left and right handles. When in place on the frame, they are held into place and supported by pocket supports that fit within the side pockets. The pocket supports are generally saddle shaped with front and rear ridges. This allows the pocket supports to support the bags without preventing access to the handle. The handle can be easily grasped and the bag only has to be lifted upward enough for the pocket to clear the front and rear ridges. Then the bag can be removed from the frame.

One aspect of the present invention is a storage device that comprises at least one bag body that has a sidewall, left and right pockets in the side wall, left and right handles incorporated into the sidewall and the pockets; a frame that includes a left vertical frame, a right vertical frame, a horizontal frame support that joins the left and right vertical frames, and an upper and lower bag supports that joins the left vertical frame and the right vertical frame. At least one left pocket support and at least one right pocket support that join the upper and lower bag supports, the pocket supports having front and rear ridges that define a trough portion, the trough portion having a lower height than the two ridges. The bag body can be received and supported by the pocket supports with the left bag pocket being received by the left pocket support and the right bag pocket being received by the right pocket support, and the handles are below the peak of the ridges and above the trough.

In another aspect of the invention, the frame includes three left pocket supports and three right pocket reports, which can engage and support three bag bodies.

In another aspect of the invention, the frame can include wheels, such as caster wheels coupled to bottom ends of the right and left vertical frames.

In another aspect of the invention, the pocket is flat and attached to the bag body to form a sleeve with an opening at the bottom of the pocket, and the bag body and pocket each have an opening that is aligned to form a handle.

In another embodiment of the invention, the bag is a flexible fabric material. In others, it can be part mesh.

In another embodiment of the invention, the frame accommodates 2, 3, 4, 5 or more bags.

Another aspect of the invention is a combination of both a storage bag and a frame. The storage bag can include a bag body, a pocket, an opposed pocket, and a handle. The frame can include a left vertical support, a second left vertical support, a right vertical support, and a second right vertical support, a base joining the left vertical supports, a base joining the right vertical supports, a top support joining the left vertical support and the right vertical support, and a top support joining the second left vertical support and the second right vertical support. In this embodiment, the top supports receive the bag pockets with the pocket resting on at least one length of the top support and the handle being above a length of the support.

In another embodiment of the invention, the handle is simply an opening in the bag pocket that is aligned with an opening in the bag body.

In another embodiment of the invention bag may include a support rod to provide a desired level of firmness to the top of the bag.

Another embodiment of the invention is a storage device that comprises a frame that comprises first and second left vertical supports joined by a base, first and second right vertical supports joined by a base; a top support joining the first supports and the second supports; a storage bag that comprises a sidewall, left and right pockets in the side wall, left and right handle opening incorporated into the sidewall and the pockets; wherein left and right pockets rest on the top support, and wherein a portion of the top support dips below the handle openings.

Other aspects and advantages of the present invention will be apparent from the following detailed description of the preferred embodiments and the accompanying drawings figures.

BRIEF DESCRIPTION OF THE DRAWINGS

FIG. 1 shows a perspective view of an embodiment of the storage device of the present invention. In this view, the frame has two bags resting thereon, and one bag that has been removed from the frame.

FIGS. 2A, 2B, and 2C show an example of construction of the storage bags of the present invention.

FIG. 3 shows three bags positioned over a frame.

DESCRIPTION OF THE INVENTION

Figure 3:
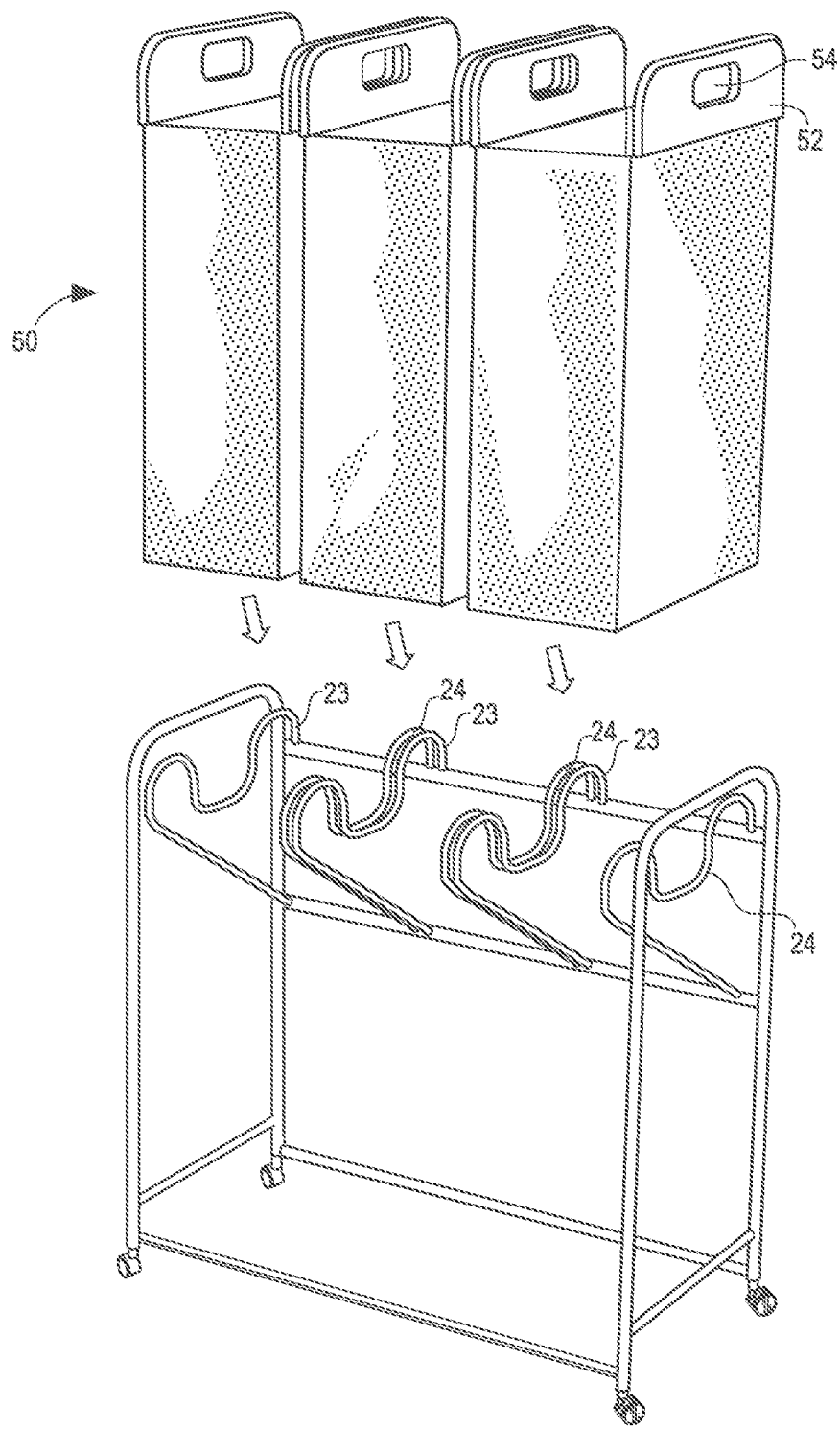
FIG. 3 shows a perspective view of a storage device of the present invention. This embodiment comprises three bags and a frame. More specifically.

As stated above, one embodiment of the present invention is a storage device that can be used as a laundry hamper or sorter. It comprises at least one bag that removably rests on a frame. In one embodiment, at least three bags can removably rest on the frame.

One embodiment is a storage device that includes at least one bag body. The bag body has a sidewall, body, and an open top. It also includes left and right pockets in the side wall, left and right handles incorporated into the sidewall and the pockets. The bag rests on a frame. The frame is comprised of a left vertical frame, a right vertical frame, a horizontal frame support that joins the left and right vertical frames, and an upper and lower bag supports that joins the left vertical frame and the right vertical frame. It also includes at least one left pocket support and at least one right pocket support that join the upper and lower bag supports. The pocket supports having front and rear ridges that define a trough portion that dips between the two ridges. The bag can be received and supported by the pocket supports with the left bag pocket being received by the left pocket support and the right bag pocket being received by the right pocket support, and the handles are below the peak of the ridges and above the trough.

Turning to the drawings, FIG. 1 shows a storage device 10 or system of the present invention. In this embodiment, three bags 50 are shown. The bags have a body 51, left and right side pockets 52, and left and right bag handles 54.

The frame 15 supports the bags in an upright and easily accessible position. The frame comprises a left vertical frame 16 and a right vertical frame 18. The vertical frames can be shaped like an upside-down "U." For additional stability, a horizontal frame support 19 can be added that joins the left and right side. The horizontal frame support 19 is typically located toward the bottom of the upside down U. Toward the other end of the vertical frames are upper 20 and lower 21 bag supports. The bag supports 20, 21, join the left and right sides. Thus, in addition to supporting the bags, by joining the left and right sides they provide stability to the frame as well.

Extending outward from the bag supports 20, 21, about the length of the top of the bag, are the left and right pocket supports 23, 24. Extending outward from the upper bag support 20, the pocket support forms a pair of ridges, a rear ridge 26 and front ridge 28. These ridges are received by the bag pockets, thereby holding the bag by the pockets. The left pocket support 23 slides into the left bag pocket and the right pocket support 24 slides into the right pocket. Between the ridges is a lower trough 30. This trough does not engage the top of the pockets when they are resting on the frame. The trough is below the handles. This allows access to the handles without interference from the pocket support. The bag can be easily be placed on the frame using the handles of the bag to place the pockets on the pocket supports.

With the trough below the handles, a user can engage the handles, lift and remove the bag from the frame. If the horizontal supports are at or below the bottom of the bag, to pull the bag away from the frame, it will only need to be lifted high enough to clear the ridges.

To facilitate ease of transportation, the frame can include wheels, such as the caster wheels 32 shown in the figures.

As shown in FIG. 1, the frame holds three containers or bags. Embodiments of the present invention include frames that hold 2, 3, 4, or other numbers of bags. For example, a frame that is designed to hold 4 bags will include four left pocket supports and four right pocket reports, which can engage and support four bag bodies.

FIG. 2 provides an example of how a bag of the present invention can be constructed. FIG. 2A shows one of the side walls 51 and a pocket 52 being attached thereto. The handle 54 in this embodiment is an opening in both the pocket and side wall that is aligned with the pocket 52 is attached to the side wall 51. FIG. 2B shows the pocket 52 having been attached to the side wall 51. The attachment option shown is the pocket 52 having been stitched to the side wall 51. Here, the stitching 53 appears across the top and both sides, leaving an opening at the bottom, thus forming the pocket. FIG. 2C shows an example of a completed bag 50, with a side wall 51, and a pocket 52. In this figure, the bag is being placed on a pocket support (shown as dashed lines).

Preferably, the bag can be made from any flexible material, including a flexible polymeric material, cotton, cotton blends, canvas, or the like. The handle can include an inflexible reinforcement to make bag handling easier, but generally speaking the bag is preferred to be flexible.

FIG. 3 shows an example of the present invention, with three bags 50 and an empty frame 15. Here, the frame is shown as being tubular. The frame can comprise metal. Each pair of pocket supports 23, 24, are aligned to receive and support the bag pockets.

Figure 4:
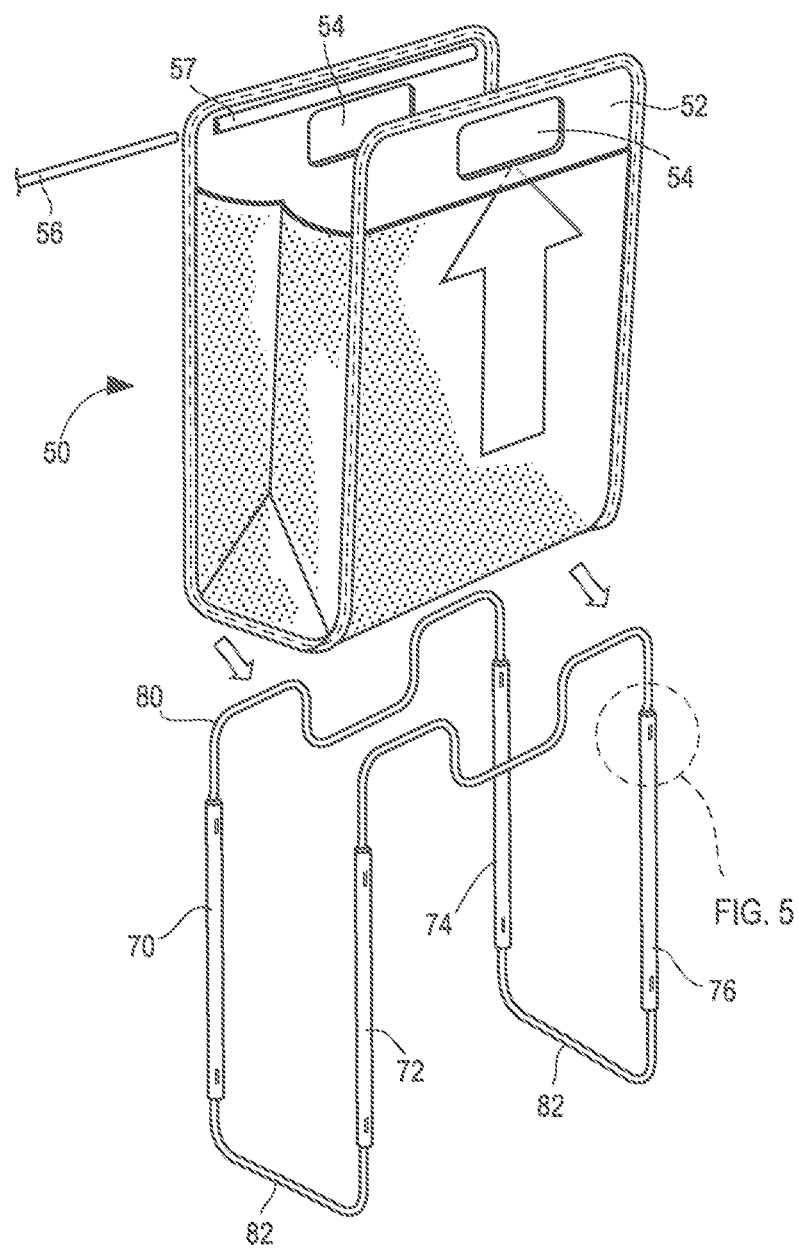
FIG. 4 is a perspective view of a bag positioned over a frame.

FIG. 4 shows an optional bag support 56 that can be incorporated if more structure in the bag 50 is desired. In the figure, the bag comprises a bag body 50, a pocket 52, an opposed pocket, and a handle. The bag support 56 is a rod that is received by a bag support sleeve 57 incorporated into the interior side of the bag side wall 51. Further, in the figure the support rod is incorporated into the top of the bag. Support can optionally be added to any part or any seam in the bag if desired.

The embodiment depicted in FIG. 4 is a frame that only holds one bag. This frame a combination of a storage bag and a frame. The frame comprises a left vertical support 70, a second left vertical support 72, a right vertical support 74, and a second right vertical support 76, a base 82 joining the left vertical supports, a base 82 joining the right vertical supports, a top support 80 joining the left vertical support and the right vertical support, and a top support joining the second left vertical support and the second right vertical support. The top supports receive the bag pockets with the pocket resting on at least one length of the top support and the handle being above a length of the support. This embodiment is depicted in FIG. 4. The arrow in FIG. 4 shows the opening in the pocket that receives the support. As with the other embodiments, to remove the bag from the frame, it only has to be lifted high enough for the pocket to clear the top support 80.

Figure 5:
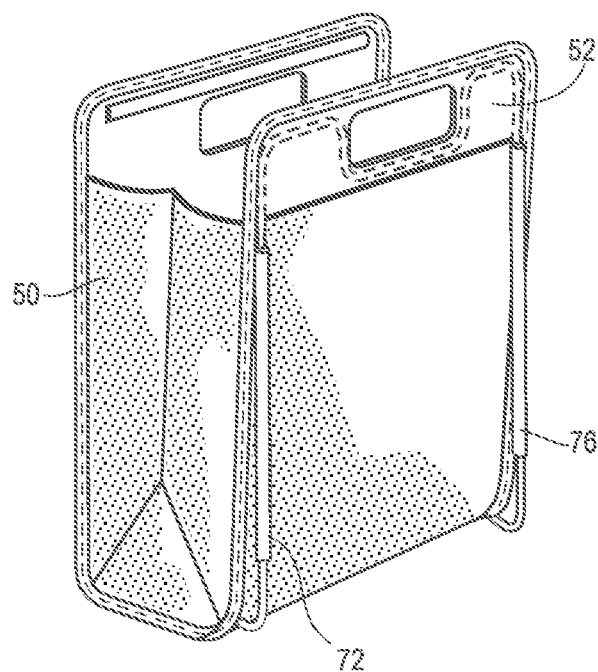
FIG. 5 shows the bag of FIG. 4 place on the frame of FIG. 4.

FIG. 5 shows the bag of FIG. 4 resting on the support of FIG. 4. Since the top support is received by the pocket, it is shown with dashed lines.

Figure 6A:
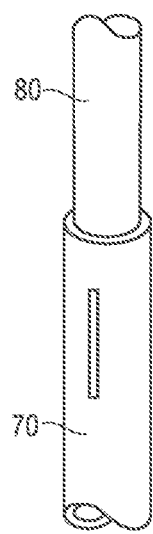
FIG. 6A, 6B, 6C, 6D is a perspective view of examples of frame connection devices of the present invention.
Figure 6B:
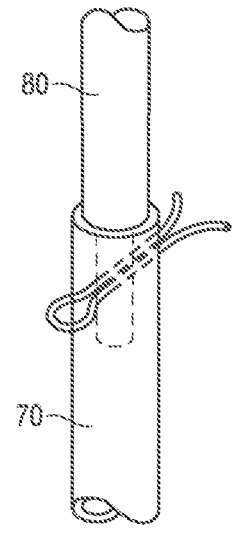
Figure 6C:
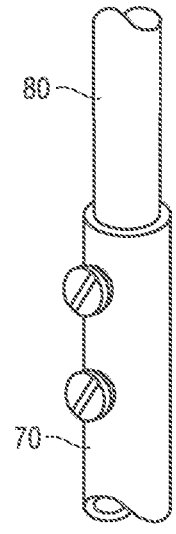
Figure 6D:
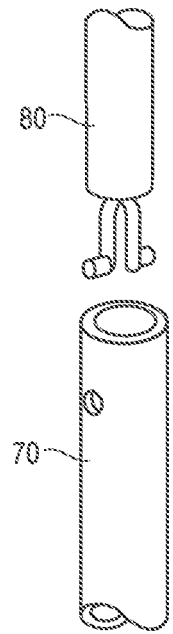

There are many options available for constructing the frame of the present invention. FIG. 6 shows several of these options. For example, when the frame is constructed from metal or plastic tubes, several connectors can be used. FIG. 6A shows an example of friction fit, FIG. 6B shows a cotter pin, FIG. 6C shows screws, and FIG. 6D shows a push pin.

Figure 7:
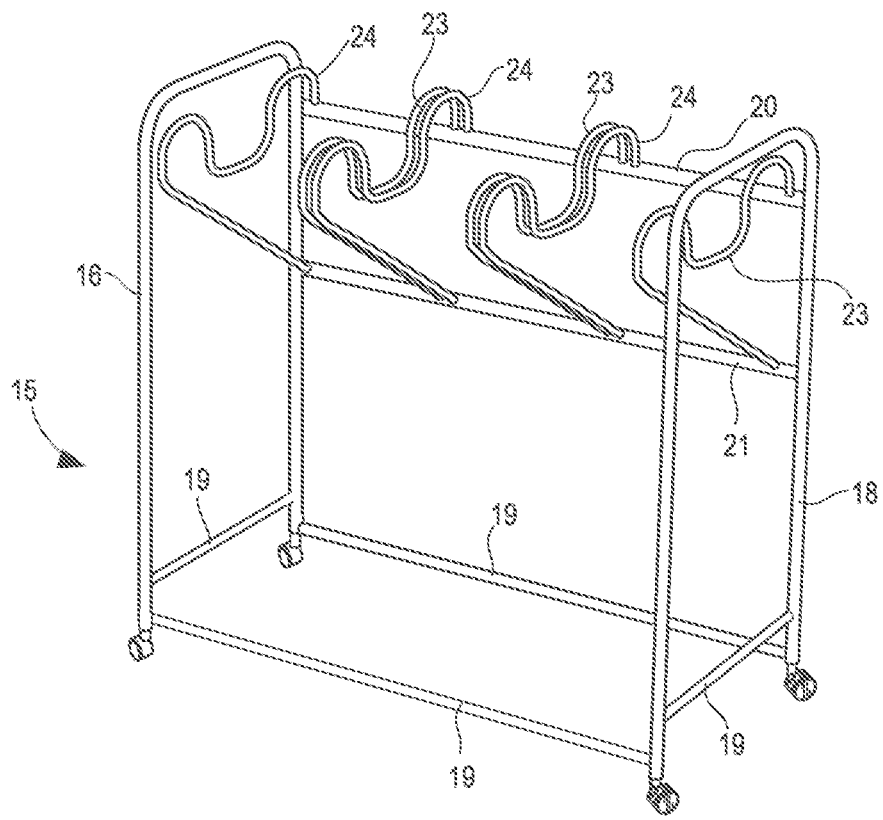
FIG. 7 is a perspective view of a frame of the present invention.
Figure 8:
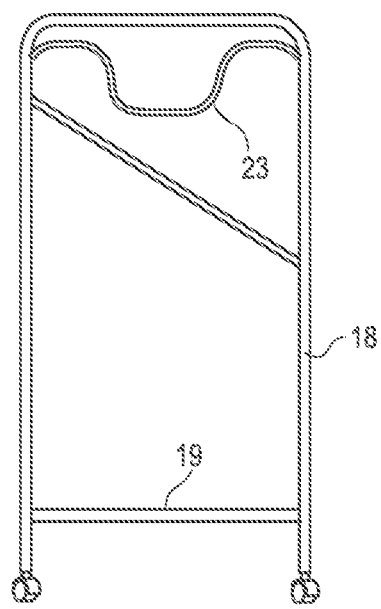
FIG. 8 is a side view of a frame of the present invention.

FIG. 7 shows a perspective view of a frame of the present invention. It offers a good example of the upper and lower bag supports 20, 21. Also, it shows examples of the left and right bag pocket supports 23, 24. FIG. 8 is a side view of a frame shown in FIG. 7.

Figure 9:
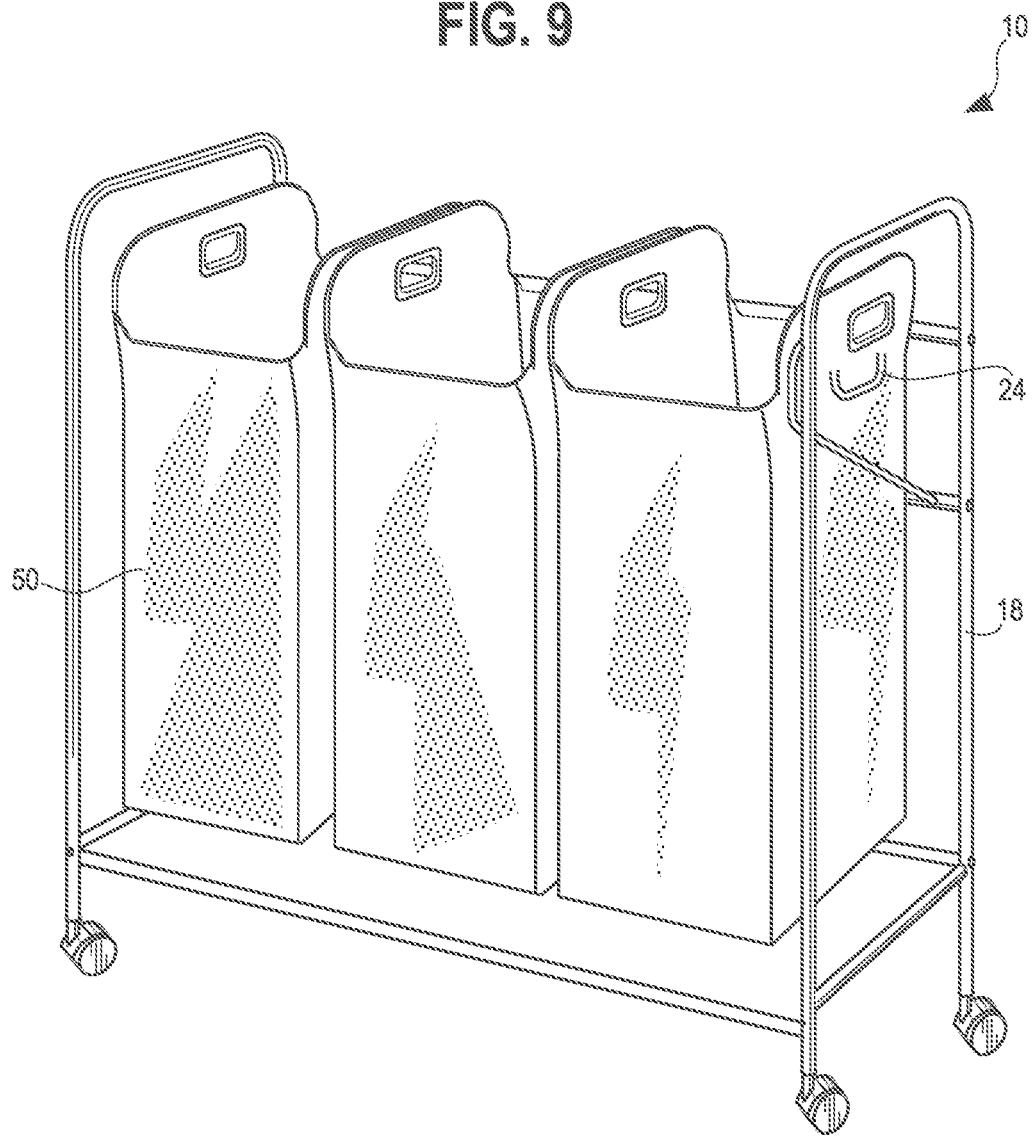
FIG. 9 is a view of a storage device of the present invention with three bags placed on and held by the frame.

FIG. 9 shows a three-bag embodiment of the present invention, with all three bags resting in the frame.

Another embodiment of the present invention is a frame that has more than 1 upper and lower support. These upper and lower supports can each have sets of bag pocket supports. In this arrangement, there can be multiple levels of bags received by the frame. For example, there may be two rows of three bags.

Accessories can be added to the frame as well. For example, a shelf may be incorporated in the top of the frame. Other accessories may be attached to or incorporated into the frame.

The invention thus being described, it would be obvious that the same can be varied in many ways. Such variations that would be obvious to one of ordinary skill in the art is to be considered as being part of the disclosure.

We claim:

1. A storage device, comprising:
   at least one bag body that comprises a sidewall, left and right pockets in the side wall, left and right handles incorporated into the sidewall and the pockets;
   a frame that includes a left vertical frame, a right vertical frame, a horizontal frame support that joins the left and right vertical frames, and an upper and lower bag supports that joins the left vertical frame and the right vertical frame;
   at least one left pocket support and at least one right pocket support that join the upper and lower bag supports, the pocket supports having front and rear ridges that define a trough portion, the trough portion having a lower height than the two ridges;
   wherein the bag body can be received and supported by the pocket supports with the left bag pocket being received by the left pocket support and the right bag pocket being received by the right pocket support, and the handles are below the peak of the ridges and above the trough; and
   wherein the left and right pockets are flat and attached to the bag body to form a sleeve with an opening at the bottom of the left and right pockets, and where the bag body and left and right pockets each have an opening that is aligned to form a handle.

2. The storage device of claim 1, wherein the frame includes three left pocket supports and three right pocket reports, which can engage and support three bag bodies.

3. The storage device of claim 1, wherein the frame includes caster wheels coupled to bottom ends of the right and left vertical frames.

4. The storage device of claim 1, wherein the bag is a flexible canvas material.

5. The storage device of claim 1, wherein the bag is a flexible polymeric material.

6. The storage device of claim 1, wherein the left vertical frame and the right vertical frame includes two upper bag supports and two lower bag supports, each with three left pocket supports and three right pocket supports, so that the frame accommodates up to six bag bodies.

7. The storage device of claim 1, wherein the bag body is rectangular in shape.

8. The storage device of claim 1, wherein frame is tubular.

9. The storage device of claim 1, wherein at least a portion of the bag is mesh.

10. In combination:
    a storage bag comprising a bag body, a pocket, an opposed pocket, and a handle; and;
    a frame that comprises a left vertical support, a second left vertical support, a right vertical support, and a second right vertical support, a base joining the left vertical supports, a base joining the right vertical supports, a top support joining the left vertical support and the right vertical support, and a top support joining the second left vertical support and the second right vertical support;
    wherein the top supports receive the bag pockets with the pocket resting on at least one length of the top support and the handle being above a length of either of the top supports; and
    wherein the handle is an opening in the bag pocket that is aligned with an opening in the bag body.

11. The combination of claim 10, wherein the bag has a support rod to provide firmness to the top of the bag.

12. The combination of claim 11, wherein the support rod is received by a sleeve in the bag body.

13. A storage device, comprising:
    a frame that comprises first and second left vertical supports joined by a base, first and second right vertical supports joined by a base; a top support joining the first vertical supports and the second vertical supports;
    a storage bag that comprises a sidewall, left and right pockets in the side wall, left and right handle openings incorporated into the sidewall and the pockets;
    wherein left and right pockets rest on the top support, and wherein a portion of the top support dips below the handle openings.

* * * * *